US011299649B2

(12) United States Patent
Klein et al.

(10) Patent No.: US 11,299,649 B2
(45) Date of Patent: Apr. 12, 2022

(54) POLYURETHANE-POLYACRYLATE HYBRID SYSTEMS FOR PACKAGING INKS AND COATINGS

(71) Applicant: SUN CHEMICAL CORPORATION, Parsippany, NJ (US)

(72) Inventors: David Klein, Wayne, NJ (US); Michael J. Jurek, Oak Ridge, NJ (US); Juanita Parris, Montvale, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 577 days.

(21) Appl. No.: 16/084,150

(22) PCT Filed: Apr. 4, 2017

(86) PCT No.: PCT/US2017/025841
§ 371 (c)(1),
(2) Date: Sep. 11, 2018

(87) PCT Pub. No.: WO2017/176671
PCT Pub. Date: Oct. 12, 2017

(65) Prior Publication Data
US 2020/0291159 A1    Sep. 17, 2020

Related U.S. Application Data

(60) Provisional application No. 62/318,262, filed on Apr. 5, 2016.

(51) Int. Cl.
| C09D 175/14 | (2006.01) |
| B32B 7/12 | (2006.01) |
| B32B 27/06 | (2006.01) |
| B32B 27/16 | (2006.01) |
| B32B 27/32 | (2006.01) |
| B32B 27/36 | (2006.01) |
| C09D 175/04 | (2006.01) |
| C09D 11/10 | (2014.01) |
| C08F 283/00 | (2006.01) |
| C08G 18/10 | (2006.01) |
| C08G 18/32 | (2006.01) |
| C08G 18/34 | (2006.01) |
| C08G 18/48 | (2006.01) |
(Continued)

(52) U.S. Cl.
CPC .............. *C09D 175/14* (2013.01); *B32B 7/12* (2013.01); *B32B 27/06* (2013.01); *B32B 27/16* (2013.01); *B32B 27/32* (2013.01); *B32B 27/36* (2013.01); *C08F 283/00* (2013.01); *C08F 283/006* (2013.01); *C08G 18/10* (2013.01); *C08G 18/3206* (2013.01); *C08G 18/348* (2013.01); *C08G 18/4854* (2013.01); *C08G 18/755* (2013.01); *C08G 18/7621* (2013.01); *C09D 11/10* (2013.01); *C09D 175/04* (2013.01); *B32B 2255/10* (2013.01); *B32B 2255/26* (2013.01); *B32B 2439/70* (2013.01)

(58) Field of Classification Search
CPC .......... B32B 7/12; B32B 27/06; B32B 27/16; B32B 27/32; B32B 27/36; B32B 2255/10; B32B 2255/26; B32B 2439/70; C08F 283/006; C08F 283/00; C08G 18/10; C08G 18/3206; C08G 18/4854; C08G 18/755; C08G 18/7621; C08G 18/348; C09D 11/10; C09D 175/04; C09D 175/14
See application file for complete search history.

(56) References Cited

U.S. PATENT DOCUMENTS

| 4,731,416 A | 3/1988 | Saunders |
| 2004/0048976 A1 | 3/2004 | Bremser et al. |
(Continued)

FOREIGN PATENT DOCUMENTS

| CN | 102 010 558 A | 4/2011 |
| WO | WO 2013/142969 A1 | 10/2013 |
(Continued)

OTHER PUBLICATIONS

International Preliminary Report issued in PCT/US2017/025841, dated Oct. 9, 2018.
(Continued)

*Primary Examiner* — Patrick D Niland
(74) *Attorney, Agent, or Firm* — Marian E. Fundytus; Ostrolenk Faber LLP

(57) ABSTRACT

Described herein are compositions suitable for use as binder components for inclusion in printing inks and coatings, such as those used in the gravure and flexographic printing process and which are printed on substrates such as polyolefin (e.g., polyethylene, polypropylene) and poly(ethylene terephthalate) (PET). The compositions are non-aqueous dispersions in which an one or more ethylenically unsaturated acrylates or (meth)acrylates is polymerized with a polyurethane, polyurethane-urea or polyurea in a non-aqueous polymerization medium, such as esters, ketones, and mixtures thereof, forming polymeric hybrid resins in the polymerization medium, which are solvent-dispersible hybrid resins of polyurethane-polyacrylate, polyurethane-urea-polyacrylate, and polyurea-polyacrylate. Films of hybrid resins are also disclosed. These materials exhibit improved film adhesion and are suitable for flexographic and gravure printing inks, especially for printing applications where adhesive lamination bond strengths are required, especially plastic films packaging applications.

12 Claims, No Drawings

(51) Int. Cl.
*C08G 18/75* (2006.01)
*C08G 18/76* (2006.01)

(56) References Cited

U.S. PATENT DOCUMENTS

2005/0199152 A1   9/2005  Hale et al.
2010/0130080 A1   5/2010  Coninx et al.

FOREIGN PATENT DOCUMENTS

WO   WO 2015/116029 A1   8/2015
WO   WO 2015/173348 A1   3/2017

OTHER PUBLICATIONS

International Search Report issued in International Application No. PCT/US17/25841, dated Jun. 27, 2017.
Written Opinion of the International Searching Authority issued in International Application No. PCT/US17/25841, dated Jun. 27, 2017.
Extended European Search Report issued in counterpart EP Application No. 17 779 614.1, dated Oct. 30, 2019.
Anonymous, "Acrylate—Wikipedia", (Feb. 21, 2019), URL: https://en.wikipedia.org/wiki/Acrylate, (Oct. 17, 2019), XP055633226 [AP] 1-15 * the whole document.

POLYURETHANE-POLYACRYLATE HYBRID SYSTEMS FOR PACKAGING INKS AND COATINGS

CROSS REFERENCE TO RELATED APPLICATIONS

The present application is a § 371 National Phase application based on PCT/US2017/025841 filed Apr. 4, 2017, which claims the benefit of U.S. Provisional Application No. 62/318,262, filed Apr. 5, 2016 the subject matter of each of which is incorporated by reference in their entirety.

FIELD OF THE INVENTION

The present disclosure is directed to non-aqueous dispersions of polymeric hybrid resins of polyurethane-polyacrylate, polyurethane-urea-polyacrylate, and polyurea-polyacrylate. Further disclosed are printing inks, coatings, primers, and overprint varnishes that include the non-aqueous dispersions or the polymeric hybrid resins isolated therefrom, or the hybrid resins transferred from one medium to another solvent medium. Such materials can be used as binders in the printing inks, coatings, etc.

BACKGROUND OF THE INVENTION

Recent diversification in the materials used to form packages, bags, and/or containers has led to the need for an improvement in the performance of printing inks or coating used to ornament or label such packaging and to provide suitable surface protection. Such inks or coating agents should exhibit excellent adhesion to different kinds of plastic films and should also exhibit blocking resistance and adaptability to boiling or retorting treatment. For example, printing ink formulations for printing on plastic films should provide improved printability, adhesion to a wider range of films and improved blocking resistance than what is provided by conventional inks and coatings.

In the field of food packaging, bags or containers made of laminated film materials are used for among other reasons, they are sanitary, they provide a barrier between the package contents and the ink so that they do not contact each other, and they provide barrier properties (e.g., moisture, oxygen) and a satisfactory appearance when printed. Laminated film materials of this kind may be produced for example, by extrusion lamination and by adhesion lamination. In the extrusion lamination method, a plastic film substrate is printed with an ink, and in some instances, a primer is applied to the inked surface and then a molten resin such as polyolefin is extruded on to the inked surface. In the adhesive laminating method, an adhesive is applied onto the inked surface of the plastic film substrate, and a plastic film is then laminated onto the same surface.

Laminating inks must possess good adhesion to the substrate that is printed, as well as good adhesiveness (e.g., lamination strength) to the film to be laminated. When the laminated film materials undergo subsequent boiling or retorting treatment, in which packages are immersed in hot water for the purpose of cooking or sterilization of the contents, the laminated film materials should not delaminate during treatment. The above-mentioned performance requirements for printing inks and coatings are dependent in many instances upon the performance of the binder resin that is used. In the case of inks used for printing plastic film, one or more different binder resins may be selected to meet the stated performance requirement for the inks.

When a binder resin in an ink or coating hardens, the resulting film should exhibit blocking resistance but have reduced adhesion to the plastic film and reduced lamination strength. For instance, when certain kinds of binder resins are used, such as acrylic-based binder resins, polyamide-based binder resins and polyester-based binder resins, the structure of the binder resin includes an aromatic ring or a highly polar functional group, which hardens the resin film. However, aromatic rings and highly polar functional groups could result in the reduction of adhesion and lamination strength. Thus, in some instances such resins may not be suited for use binder resin component for laminating inks and coatings.

The hardness of a polyurethane resin in a coated film and its adhesion to a plastic film may be improved by increasing the concentration of urethane bonds in the polyurethane molecule. An ink containing a polyurethane resin of this kind provides good adhesiveness and lamination strength, as compared to inks containing other resins providing ink films having the same hardness. For this reason, polyurethane resins in which the urethane bond concentration is increased have been used as binders for printing inks and coatings for use in laminates of plastic films. However, polyurethane resins in which the urethane bond concentration is highly increased do not provide sufficient adaptability for printing or adhesion stability. To eliminate this problem, a two-component reaction type resin system can be used that is composed of one component containing a polyurethane resin and the other component containing a polyisocyanate compound as a curing agent. However, the two-component reaction type resin system has its own problems. Since the main component must be mixed with the curing agent immediately before being used, it is inconvenient to handle, it has a short pot life, and the ink or coating after printing is unstable. Further, the use of expensive curing agents substantially raises costs of packaging bags or containers.

Plastic film substrates such as those used in laminates are often printed using flexographic printing or gravure printing. In flexographic printing, the flexographic ink or coating is applied to the surface of a resilient letter-press image, and the image is then transferred to the plastic print stock. Flexographic inks, for example, may typically contain a polar organic solvent such as an alkanol, which dissolves ink binder components but which does not swell or otherwise deteriorate the letter-press image. In gravure printing, the gravure ink is deposited in image wells in the flat surface of a gravure plate, and the deposited ink image is then transferred to the print stock. Since gravure printing is often carried out at high speeds, the gravure ink may contain volatile organic solvents such as alkyl esters, which dissolve ink binder components and are rapidly removed during the drying process.

Accordingly, flexographic ink and gravure ink each have specific performance requirements related to the different characteristics of these printing methods. As a result, the inks and coatings for each application are formulated to meet the requirements, and this includes the binder components used in flexographic and gravure inks. Such specific binder components, which may be designed for one ink type, may be incompatible in solvent systems of other ink types. This may necessitate the preparation and storage of two distinct ink systems, and the expenses attendant thereto.

While there continues to be a need for an improved laminating ink and coating in general, there also is a need for a single binder resin system which can be used to formulate inks and coatings useful for both flexographic and gravure printing applications.

Solvent-borne flexible packaging printing inks are widely used in the graphic arts industry. Such printing inks are economical and provide versatility, quality and simplicity. Such inks permit a roll of material to be printed with multiple colors in a continuous web at speeds of over 300 meters per minute, and the printed material can be fed into converting machines for slitting, forming or laminating. However, these inks must be formulated in order to insure high bond strength and block resistance. In addition, solvent-borne flexible packaging inks are generally not receptive to water-borne primers or adhesives.

Recent diversification in package bags or containers has required a high degree of performance for printing inks or coating agents used for the ornamentation or surface protection. Such inks or coating agents should exhibit good adhesiveness to various kinds of plastic films and blocking resistance, and good adaptability for boiling or retorting treatment. For instance, printing inks for plastic films are needed to provide improved printability, adhesion to a wider range of films, and improved blocking resistance and faster printing speeds when compared to conventional printing ink formulations.

Blocking is a problem which may occur when printing on non-absorbent substrates such as flexible packaging. Blocking manifests itself as a sticking or transfer of the image to the underside of the web. Adhesion of the ink to the substrate is a particularly difficult problem to resolve in the case of non-absorbent substrates (e.g., flexible packaging). With paper printing, there is usually no problem of adhesion since the ink is able to penetrate the paper and thus "grab" the surface. However, in the case of non-absorbent substrates, adhesion is affected by chemical and physical bonds. Wetting between the surface of the substrate and the ink is also a consideration.

Solvent-based inks represent the bulk of the laminating inks consumed for packaging. The main resins used in solvent applications are acrylics, modified acrylics, polyamides, and urethanes. These soluble resins typically wet out and adhere to the film surfaces and laminated structures with superior bonds.

In the manufacture of printing inks, efforts are continuously made to develop new and improved polymeric compositions useful as pigment binders in inks for printing a variety of substrates. In particular, there is demand for those inks which can be printed or laminated on polyolefin substrates such as polyethylene, polypropylene or poly(ethylene terephthalate). These inks must possess a number of qualities to be commercially useful, including good acetate solubility and reducibility, and good viscosity stability in solution, among others.

SUMMARY OF THE INVENTION

The present disclosure is directed to non-aqueous dispersions of polymeric hybrid resins of polyurethane-polyacrylate, polyurethane-urea-polyacrylate, and polyurea-polyacrylate. The polymeric hybrid resins are synthesized by free radical polymerization in a suitable solvent/medium that includes one or more ethylenically unsaturated acrylic monomers, such as for example, (meth)acrylic ester monomers, and a polymer soluble in the medium that is one or more of a polyurethane, a polyurethane-urea, and a polyurea. A non-aqueous dispersion system containing the polymeric hybrid resins is thus produced. Further disclosed are printing inks, coatings, primers, and overprint varnishes that include the non-aqueous dispersions, and/or the polymeric hybrid resins isolated therefrom, and/or the hybrid resins transferred to another solvent medium. Such materials can be used as binders in the printing inks, coatings, etc., and are well suited for use in flexographic and gravure printing processes. When included in an ink and/or coating composition, the presence of the non-aqueous dispersions in the inks, coatings, etc. improve film adhesion, which is beneficial for printing applications where good bond strength exhibited in adhesive lamination is required. Such applications include plastic film packaging applications.

The printing inks, coatings, etc. may be printed on substrates such as polyolefin (e.g., polyethylene, polypropylene) and poly(ethylene terephthalate) (PET), and other substrate materials. Printing may be by way of the gravure and flexographic printing processes. The solvent mediums may be, for example, esters, ketones, and mixtures thereof.

In another aspect of the present disclosure, described herein are polymeric films comprising polymeric hybrid resins of polyurethane-polyacrylate, a polyurethane-urea-polyacrylate, and a polyurea-polyacrylate. In still another aspect, the polymeric films derive from the non-aqueous dispersions, e.g., by separating the medium from the hybrid resin, to produce a film comprised of the polymeric hybrid resins. In a still further aspect, the separation may include the removal of the medium by drying with or without heat. Such films may be used in printing inks, coatings, etc. The films may be incorporated into another solvent medium, which also be used in in printing inks, coatings, etc.

In another aspect of the present disclosure, described herein are ink-, coating-, primer-, or overprint varnish-compositions (collectively, "compositions"), comprising the described non-aqueous dispersions and/or polymeric films. The compositions may further comprise one or more of a solvent and a colorant.

In still another aspect of the present disclosure, described herein is a multilayer structure comprising:
  a substrate, optionally having a primer layer applied thereto;
  a plurality of ink layers; and
  optionally, an overprint varnish layer, wherein one or more of the ink layers, optional primer layer, and optional overprint varnish layer comprise the compositions that include the non-aqueous dispersions described herein. The multilayer structure may further include a second substrate positioned over the plurality of ink layers. The multilayer structure may further include a curing component, and the multilayer structure may be cured by actinic radiation.

In yet still another aspect of the present disclosure, described herein is a multilayer laminated structure comprising:
  a substrate;
  a top laminate layer; and
  intermediate layers between the substrate and top laminate layer, comprising:
    an optional primer layer applied to the substrate;
    a plurality of ink layers; and
    an optional overprint varnish layer;
    wherein one or more of intermediate layers comprise the compositions that include the non-aqueous dispersions described herein.

In another aspect, the multilayer laminated structure includes a top laminate layer that is a layer of molten resin extruded onto the intermediate layers. The multilayer laminated structure may further include an adhesive layer applied over the intermediate layers, wherein the top laminate layer comprises a plastic film applied over the adhesive layer. The multilayer laminated structure may further include a second substrate positioned over the plurality of ink layers. The multilayer laminated structure may further include a curing component, and the multilayer structure may be cured by actinic radiation.

DETAILED DESCRIPTION OF THE INVENTION

In one inventive aspect, non-aqueous dispersions are produced that include a solvent/medium comprising polymeric hybrid resins that are the products of a polymerization reaction in the solvent/medium between a polymer soluble in the medium that is one or more of a polyurethane, a polyurethane-urea, and a polyurea and one or more ethylenically unsaturated acrylic monomers, oligomers, or polymers. Such one or more ethylenically unsaturated acrylic monomers, oligomers, or polymers may be, for example, one or more unsaturated acrylic or (meth)acrylic ester monomers. Free radical polymerization may be the mechanism of polymerization in the solvent/medium, in which case polymerization may be initiated by introducing a peroxy initiator into the solvent/medium that contains the reaction components. The hybrid resin of polyurethane, polyurethane-urea, polyurea and polymerized acrylate preferably comprises about 30 wt % to about 40 wt % polyurethane, polyurethane-urea, or polyurea. Preferably, such hybrid resins have number average molecular weights (Mn) of about 1,000 Daltons to about 200,000 Daltons, preferably about 2,000 Daltons to about 100,000 Daltons, and most preferably about 5,000 Daltons to about 20,000 Daltons.

In one aspect of the present disclosure, the ratio of the polyurethane, polyurethane-urea, or polyurea to acrylate polymer in the hybrid resins is, on a molar basis, 10/90 to 90/10, more preferably, 25/75 to 50/50, and most preferably, 30/70 to 40/60.

In another aspect of the present disclosure, described herein are polymeric films comprising a hybrid polymer produced by copolymerization of an acrylate with a polymer selected from a polyurethane-polyacrylate, a polyurethane-urea-polyacrylate, and a polyurea-polyacrylate. Such films may be comprised of the hybrid resins produced in the non-aqueous medium by separating same from the solvent/medium, thereby producing a film comprised of the hybrid resin.

In another aspect of the present disclosure, the molecular weights of the non-aqueous dispersions containing the hybrid polymers are sufficiently high to allow for the formation of coherent films that can be used as a laminating adhesive. Number average molecular weights (Mn) may be about 1,000 Daltons to about 200,000 Daltons, preferably about 2,000 Daltons to about 100,000 Daltons, and most preferably about 5,000 Daltons to about 20,000 Daltons.

The non-aqueous dispersions and films of the hybrid polymers described herein are suited for inclusion in inks, coatings, primers, and overprint varnish compositions. In particular, non-aqueous dispersions and films of the hybrid polymers are well suited for use in printing inks used in the methods exemplified by: flexographic, gravure, digital, rod, curtain, cascade, roll, slot, spray processes, and combinations thereof. In particular, they are well-suited for inclusion in flexographic and gravure printing inks. Since the hybrid polymer compositions described herein exhibit improved film adhesion, the non-aqueous dispersions and films of the hybrid polymers are particularly well-suited for inclusion in inks used in printing items where good adhesive lamination bond strengths are a consideration, such as, for example, plastic films packaging applications.

In one aspect of the polymer systems described herein, where the hybrid polymer produced in the non-aqueous dispersion is the product of an acrylate and a polyurethane-urea polymer that is soluble in the medium, the polyurethane-urea polymer may be the reaction product of: (a) a diisocyanate component; (b) a diol component having (i) a first diol having a molecular weight preferably below 2000; and (ii) a polymeric diol having a molecular weight preferably below 3000; and (c) a diamine based on the equivalents of the unreacted —NCO groups; whereby the resulting polyurethane-urea resin is soluble in organic solvent, such as, for example, n-propyl acetate, n-propanol, and mixtures thereof. During the co-polymerization in the solvent medium, heat is added and a free radical polymerization reaction between the polyurethane-urea polymer and the acrylic monomers takes place in the presence of peroxyester initiators to produce hybrid polyurethane-urea-polyacrylate resin within the non-aqueous dispersion. The hybrid polymer systems described herein may be used in solvent-based laminating inks, in flexographic inks, and in gravure inks.

In another aspect of the present disclosure, described is a solvent-based laminating ink useful in flexographic and/or gravure printing comprising the hybrid polyurethane-urea-polyacrylate resin described above, present in a non-aqueous dispersion or as a film, and one or more solvents, preferably organic solvents. Optionally, the laminating inks include a colorant.

In one aspect of the present disclosure, the solvent/medium in which the polymerization of the hybrid polymers takes place is a polar non-aqueous solvent/medium such as, for example, esters, ketones, and mixtures thereof. The acrylate monomers and the polyurethane, polyurethane-urea or polyurea are soluble in the selected solvent medium. In another aspect, the solvent/medium is chosen from n-propyl acetate, ethyl acetate, n-butyl acetate, n-hexyl acetate, methyl ethyl ketone; methyl isobutyl ketone, and mixtures thereof.

In yet another aspect of the present disclosure, described is a method for printing an image on a polymeric substrate comprising: (a) printing the laminating or surface printing inks described herein onto a surface of the polymeric substrate as an image; and (b) drying the image, whereby a tack-free image is formed. The image is firmly adhered to the substrate and un-blocked when contacted under pressure at ambient temperatures to a second surface of the substrate.

The solubility of the polyurethane, polyurethane-urea, and polyurea resins in ester and alcohol/ester solvents/mediums allows for the formulation of a versatile ink or coating composition, e.g., usable in both flexographic and gravure applications, with only minor formulation modifications. The described polymeric hybrid resins of polyurethane-polyacrylate, polyurethane-urea-polyacrylate, and polyurea-polyacrylate formed during polymerization are preferably stable in the medium, e.g., discreet layers do not form in the medium. Discreet layers, such as a layer of solid and a layer of liquid, evidence an absence of stability. The non-aqueous dispersions described herein exhibit a positive Tyndall effect, which is evidence of a dispersion comprised of particles of the polymeric hybrid resins that may have some degree of solubility in the medium (e.g., partial insolubility), or the particles may be fully insoluble in the medium.

Preferably, the medium is an organic medium in which the starting polyurethane, polyurethane-urea and polyurea are soluble. Examples of such mediums comprise, for example, esters, ketones, alcohols, and mixtures thereof, such as the mixture of an alcohol and an ester. Such non-aqueous dispersions are particularly useful in formulating packaging laminating inks. The polymeric hybrid resins formed in the medium are insoluble therein, or only partially soluble (e.g., partially insoluble).

The hybrid resins disclosed herein, whether in the non-aqueous dispersion or as a film coating can be formulated into an ink composition without adjuvants; without grinding same in polyvinyl butyral; and/or without blending same into a nitrocellulose base, e.g., a pigment dispersed with nitrocellulose in organic solvent and ground to a desired particle size. Laminating or surface printing inks and coating compositions formed with the non-aqueous dispersions of hybrid resins or coatings of hybrid resins exhibit excellent lamination bond strengths, low tack, block resistance, printability, and superior adhesion on a wide variety of films (substrates) compared to laminating inks and coatings made with conventional and commercially available resin binder systems.

Polyurethane Resin-Based Hybrid Polymers

In one aspect of the present disclosure, the non-aqueous dispersion includes a hybrid polymer that is the reaction product of a polyurethane resin that is soluble in the medium and one or more ethylenically unsaturated acrylates, wherein the solvent-soluble polyurethane resin derives from the condensation of di-isocyanate (e.g., having —NCO groups), and approximately equimolar quantities of a di-alcohol or a mixture of di-alcohols. The resulting polyurethane resin has the structure:

-(-A-NH—CO—O—R$_2$—O—CO—NH—)$_n$-A-NH—CO—O—R$_2$—O—CO—NH-A- where -A- is an aryl or alkyl group; R$_2$ comprises R$_3$ and R$_4$, wherein R$_3$ is an alkyl or a polymeric group having a molecular weight below 2000, and wherein R$_4$ is a polymeric group having a molecular weight below 3000 and n has the value of 1 or 2. Typically, the molecular weight of R$_3$ is less than the molecular weight of R$_4$, and the molar ratio of R$_4$ to R$_3$ ranges between about 90:10 and about 10:90. A preferred ratio of R$_4$ to R$_3$ is about 55:45. Preferably, the resin has a number average molecular weight between about 1,000 and about 60,000 Daltons.

Polyurethane-Urea Resin-Based Hybrid Polymers

In one aspect of the present disclosure, the non-aqueous dispersion includes a hybrid polymer that is the reaction product of a polyurethane-urea resin that is soluble in the medium and one or more ethylenically unsaturated acrylates, wherein the solvent-soluble polyurethane-urea resin derives from the condensation of polyurethane pre-polymer preferably containing 1.3 to 6.0 wt % of unreacted isocyanate (i.e., —NCO) groups, and 80% to 120% of a diamine based on the equivalents of the unreacted —NCO groups. The resulting polyurethane-urea resin has the structure:

NH$_2$—R$_1$—NH—CO—NH(—U—NH—CO—NH—R$_1$—NH—CO—NH—)$_m$—U—NH—CO—NH—R—NH$_2$ wherein R$_1$ is a covalent bond or a C$_1$-C$_{10}$ alkyl group, m is 2-4 and —U— has the structure:

-(-A-NH—CO—O—R$_2$—O—CO—NH—)$_n$-A-NH—CO—O—R$_2$—O—CO—NH-A- wherein -A- is an aryl or alkyl group; R$_2$ comprises R$_3$ and R$_4$, wherein R$_3$ is an alkyl or a polymeric group having a molecular weight below 2000, and wherein R$_4$ is a polymeric group having a molecular weight below 3000 and n has the value of 1 or 2. Typically, the molecular weight of R$_3$ is less than the molecular weight of R$_4$, and the molar ratio of R$_4$ to R$_3$ ranges between about 90:10 and about 10:90. A preferred ratio of R$_4$ to R$_3$ is about 55:45. Preferably, the resin has a number average molecular weight between about 10,000 and about 80,000. A solvent soluble polyurethane-urea resin is described in U.S. Pat. No. 6,723,820, incorporated herein by reference. This polyurethane-urea resin is PUC, used in at least some of the examples, infra, of the present disclosure.

Polyurea Resin-Based Hybrid Polymers

In one aspect of the present disclosure, the non-aqueous dispersion includes a hybrid polymer that is the reaction product of a polyurea resin that is soluble in the medium and one or more ethylenically unsaturated acrylates, wherein the polyurea resin derives from the condensation of di-isocyanate (i.e., —NCO) groups, and approximately equimolar quantities of a diamine or diamines. The diamine in this case generally should be more flexible to remain non-crystalline and soluble in a solvent. The resulting polyurea resin has the structure:

NH$_2$—R$_1$(—NH—CO—NH—R$_2$—NH—CO—NH—)$_x$—R$_1$—NH$_2$ wherein R$_1$ is a covalent bond or a C$_1$-C$_{10}$ alkyl group or an ethylene glycol or propylene glycol or a combination thereof with a repeat length of 1 to 20 units, and x is 5-100. Suitable diamines used to make the polyurea are available from Huntsman Chemicals under the trade names Jeffamine® Diamines, such as, for example, the D, ED, and EDR series.

The non-aqueous dispersions described herein can be prepared using pre-formed resins of polyurethane, polyurethane-urea or polyurea added to an organic solvent/medium as soluble feedstock. A free radical polymerizable monomer, such as acrylate and (meth)acrylate monomers, and a suitable initiator component such as a peroxy initiator may then be added to the solution to produce a hybrid polyurethane-polyacrylate, polyurethane-urea-polyacrylate or polyurea-polyacrylate hybrid resin present in a non-aqueous dispersion.

Examples of suitable ethylenically unsaturated acrylate monomers that may be co-polymerized with the polyurethane, polyurethane-urea, or polyurea resins include mono-functional ethylenically unsaturated acrylate and (meth)acrylate monomers such as: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate, the (meth)acrylates thereof; and combinations thereof.

Multifunctional ethylenically unsaturated acrylate and (meth)acrylate monomers may also be used, such as, for example: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate; the (meth)acrylates thereof; and combinations thereof.

Other functional monomer types that are capable of being used in part in the formulations include cyclic lactam such as N-vinyl caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide, and combinations thereof.

In one aspect of the present disclosure, the ratio of the polyurethane, polyurethane-urea, or polyurea to acrylate polymer in the hybrid resins is, on a molar basis, 10/90 to 90/10, more preferably, 25/75 to 50/50, and most preferably, 30/70 to 40/60.

While not being bound by any theory, since the polyurethane, polyurethane-urea, and polyurea parent polymers are soluble and stable in the solvent/medium used for the polymerization, it seems that an interaction, such as a grafting reaction, occurs between the ethylenically unsaturated acrylates and parent polymers of solvent-soluble polyurethane, polyurethane-urea, and polyurea, or the interaction may be another unknown effect. In any event, the resulting hybrid resins are at least partially insoluble (and possibly fully insoluble) in the non-aqueous dispersion. The partial insolubility can be readily observed in some samples as a stable milky-white fluid. In other cases, particles can be observed in an otherwise clear solution when a laser light is passed through the sample. This is known as the Tyndall effect, or Tyndall scattering. The Tyndall effect is light scattered by particles in a colloid or particles in a fine suspension. The Tyndall effect is used to determine the size and density of particles in aerosols and other colloidal matter. In laboratory environments, a hand held laser pointer can be used as the source to identify particles in (an apparent) solution. In one aspect, the non-aqueous dispersions of the present disclosure exhibit positive Tyndall effects, evidencing a dispersion of at least partially insoluble particles, which particles may be microparticles, e.g., having sizes expressible in micrometers.

Non-aqueous dispersions prepared in accordance with the present invention may be transferred to a second non-aqueous medium, e.g., a non-aqueous medium that is different from the non-aqueous medium in which the dispersions are prepared. Examples of solvents to which the polar functional non-aqueous dispersions can be transferred include alcohols such as, for example, ethanol, n-propanol, isopropanol, and n-butanol; esters such as, for example, n-butyl acetate, n-hexyl acetate, and pentyl propionate; ethers such as, for example, the monoethyl, monobutyl and monohexyl ethers of ethylene glycol; ketones such as, for example, methyl ethyl ketone methyl isobutyl ketone, and diisobutyl ketone; aromatic hydrocarbons such as, for example, xylene and toluene; and mixtures thereof. For use in energy cure coating/printing applications, the non-aqueous dispersions prepared in accordance with the present invention may be transferred to a second non-aqueous medium, e.g., a non-aqueous medium that is different from the non-aqueous medium in which the dispersions are prepared. This includes multi-ethylenically unsaturated acrylates such as those listed above; monofunctional ethylenically unsaturated monomers such as those listed above; and other functional monomer classes such as those listed above; and oligomers described as multi-ethylenically unsaturated acrylates having repeat backbone units, such as polyester acrylates, polycarbonateacrylates, urethane acrylates, and epoxy acrylates and mixtures and the like.

Transfer to a different medium can be achieved by a variety of methods, for example, by spray-drying, freeze-drying, coagulation, or centrifugation of the original non-aqueous medium followed by re-dispersion of the polymeric material, e.g., the polymeric hybrid resins, in the new medium. In one particular aspect, transfer of the polymeric material to the new medium is accomplished by adding a different organic medium to the original non-aqueous dispersion and then removing the original solvent medium by distillation, thereby forming a new aqueous dispersion medium comprised of the polymeric material dispersed in the different organic medium. All of these methods are well understood by those skilled in the art and will not be discussed in detail here.

Solvent-Based Laminating Ink

The solvent-based laminating or surface printing ink of the present invention comprises the non-aqueous dispersion described herein, e.g., a non-aqueous dispersion comprising the polymeric hybrid resins selected from polyurethane-polyacrylate, polyurethane-urea-polyacrylate, and polyurea-polyacrylate in a non-aqueous medium; optionally a colorant; and an organic solvent. More than one such non-aqueous dispersion, such as a combination of polyurethane-polyacrylate and polyurethane-urea-polyacrylate non-aqueous dispersions may be present in an ink, or one of the aforedescribed non-aqueous dispersions may be present with another kind of non-aqueous dispersion in an ink. The ink system of the present invention has a unique characteristic in that it may be used in either flexographic or gravure printing by making relatively minor adjustments to the formulation (e.g. adjusting the solvent and viscosity). In particular, the ink of the present invention comprises, based on the weight of the ink: about 15 wt % to about 50 wt % of the hybrid resin; about 6 wt % to about 30 wt % of the colorant; and about 10 wt % to about 60 wt % of organic solvent. Component concentrations may be adjusted for use in flexography or gravure printing.

Method of Printing a Laminating Ink

In one aspect of the present disclosure, the laminating or surface printing ink as described is image-wise printed onto a surface of a polymeric substrate, thereby forming a dried ink image which is tack-free and is firmly adhered to the surface of the substrate, and un-blocked when contacted under pressure at ambient conditions to a second surface of the substrate. Although any polymeric substrate may be printed with this method, preferred polymeric substrates include, in sheet form, polyethylene, polypropylene, orientated polypropylene (OPP), orientated polystyrene (OPS), polyethylene terephthalate (PET), glycol-modified polyethylene terephthalate (PET-G), polylactic acid (PLA) cellulose acetate, cellulose acetate butyrate, polycarbonate, polyamide, polyvinylidene chloride (PVDC) coated polyethylene terephthalate, PVDC coated polypropylene, metallized polyethylene terephthalate, or metallized polypropylene. Particularly preferred film substrates used for lamination are oriented polypropylene and treated polyester films.

In a preferred embodiment of the present invention, a second substrate may be applied or laminated onto the dried ink image on the first substrate by any conventional method. Thus, the second substrate may be applied as an extruded melt onto the dried image to form the second substrate; or a preformed second substrate may be laminated to the dried ink image through an adhesive layer. The second substrate may be composed of the same material as the first substrate or it may be different, depending on the nature of the end use of the printed laminate. In one embodiment, the second substrate is a polyethylene.

Colorant

The inks of this invention contain one or more colorants such as soluble dyes, pigments or mixtures thereof. Such inks typically contain one or more pigments dispersed therein. The pigment may be any conventional organic or inorganic pigment such as Pigment Yellow 1, Pigment Yellow 3, Pigment Yellow 12, Pigment Yellow 13, Pigment 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 170, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, Pigment Black 7, titanium dioxide, carbon black, and the like. The classes of dyes suitable for use in present invention are selected from acid dyes, natural dyes, direct dyes either cationic or anionic direct dyes, basic dyes, and reactive dyes. The acid dyes, also regarded as anionic dyes, are soluble in water and mainly insoluble in organic solvents and are selected, from yellow acid dyes, orange acid dyes, red acid dyes, violet acid dyes, blue acid dyes, green acid dyes, and black acid dyes. European Patent 0 745 651, incorporated herein by reference, describes a number of acid dyes which are suitable for use in the present invention.

The yellow acid dyes selected include Acid Yellow 1 (CI. 10316); Acid Yellow 7 (CI. 56205); Acid Yellow 17 (CI. 18965); Acid Yellow 23 (CI. 19140); Acid Yellow 29 (CI. 18900); Acid Yellow 36 (CI. 13065); Acid Yellow 42 (CI. 22910); Acid Yellow 73 (CI. 45350); Acid Yellow 99 (CI. 13908); Acid Yellow 194; and Food Yellow 3 (CI. 15985). The orange acid dyes selected include Acid Orange 1 (CI. 13090/1); 35 Acid Orange 10 (CI. 16230); Acid Orange 20 (CI. 14603); Acid Orange 76 (CI. 18870); Acid Orange 142; Food Orange 2 (CI. 15980); and Orange B. The red acid dyes selected include Acid Red 1 (CI. 18050); Acid Red 4 (CI. 14710); Acid Red 18 (CI. 16255); Acid Red 26 (CI. 16150); Acid Red 27 (CI. 16185); BASOVIT™ 425E (available from BASF Corporation) a Xanthone based acid dye also known as Acid Red 51 (CI. 45430); Acid Red 52 (CI. 45100); Acid Red 73 (CI. 27290); Acid Red 87 (CI. 45380); Acid Red 94 (CI. 45440); Acid Red 194; and Food Red 1 45 (CI. 14700). The violet acid dyes selected include Acid Violet 7 (CI. 18055); and Acid Violet 49 (CI. 42640). The blue acid dyes selected include Acid Blue 1 (CI. 42045); Acid Blue 9 (CI. 42090); Acid Blue 22 (CI. 42755); Acid Blue 74 (CI. 73015); Acid Blue 93 (CI. 42780); and Acid Blue 158A (CI. 15050). The green acid dyes selected include Acid Green 1 (CI. 10028); Acid Green 3 (CI. 42085); Acid Green 5 (CI. 42095); Acid Green 26 (CI. 44025); and Food Green 3 (CI. 42053). The black acid dyes selected include Acid Black 1 (CI. 20470); Acid Black 194 55 (BASANTOL™ X80, available from BASF Corporation, an azo/1:2 CR-complex also known as. The direct dyes selected for use in the present invention include Direct Blue 86 (CI. 74180), Direct Red 199, Direct Red 168, Direct Red 253 (CI. Not Assigned) and Direct Yellow 107/132 (C.I. Not Assigned). The direct dyes are commonly used in coloration of pulp paper. The natural dyes selected for use in the present invention include Alkanet (C.I. 75520, 75530); Annatto (CI. 75120); Carotene (CI. 75130); Chestnut; Cochineal (CI. 75470); 65 Cutch (CI. 75250, 75260); Divi-Divi; Fustic (CI. 75240); Hypernic (CI. 75280); Logwood (CI. 75200); Osage Orange (CI. 75660); Paprika; Quercitron (CI. 75720); Sanrou (CI. 75100); Sandal Wood (CI. 75510, 75540, 75550, 75560); Sumac; and Turmeric (CI. 75300).

The reactive dyes selected for use in the present invention include Reactive Yellow 37 (monoazo dye); Reactive Black 31 (bisazo dye); Reactive Blue 77 (phthalocyanine dye) and Reactive Red 180 and Reactive Red 108 dyes. Acid dyes such as, for example, Acid Black 194; Acid Red 51, Acid Blue 9; Acid Green 26; Acid Yellow 36, Acid Orange 142, Direct Blue 86, Direct Red 253 and Direct Yellow 107/132 dyes may be preferred dyes.

Organic Solvent

A number of organic solvents may be used in conjunction with formulating the laminating or surface printing inks of the present invention. Useful organic solvents include ester solvents such as, for example, ethyl acetate and n-propyl acetate; and polar solvents such as, for example, ester/alcohol mixtures. Alcohols may be used as the solvent, such as, for example, ethanol, n-propanol, and glycols such as, for example, ethylene glycol. Preferably, the ink-formulating solvent is similar to or the same as the process solvent described supra in connection with the preparation of the hybrid resins.

Adjuvants

The solvent based laminating or surface printing inks of the present invention may further contain additives known in the art that are used to modify flow, surface tension, gloss, flow, pigment wetting and abrasion resistance of the cured coating or printed ink. Such additives contained in inks or coatings typically are surface-active agents, waxes, shelf-life stabilizers, etc. and combinations thereof. These additives may function as leveling agents, shelf-life stabilizers, wetting agents, slip agents, flow agents, dispersants and de-aerators. Preferred additives include fluorocarbon surfactants, silicones and organic polymer surfactants. Examples include the Tegorad product lines (Tegorad are trademarks and are commercially available products of Tego Chemie, Essen, Germany) and the Solsperse product lines (Solsperse are trademarks and are commercially available products of Lubrizol Company).

EXAMPLES

Method of Molecular Weight Determination

The molecular weights and polydispersity values were measured via Gel Permeation Chromatography (GPC) using a Waters 515 HPLC Pump equipped with a Waters 2410 refractive index detector with Waters Millennium chromatography software, version 3.0, and a Phenogel GPC 4 column set 300×7.8 mm OD, 5µ particle size and pore sizes of 100 Å, 500 Å, 10^3 Å and 10^4 Å. All samples were prepared as follows: a 2% solution is made by weighing approximately 0.2 g in 10 mL of THF in a 20 mL clear borosilicate vial. The vial and contents are mixed on a Titer Plate Shaker for 20 minutes at ambient temperature and then allowed to stand for 24 hours. Two to five mL is then filtered through a 0.45 µm Millipore Filter. Fifty (50) µL is injected. As used herein, "polydispersity" or "dispersity" is the measure of the broadness of a molecular weight distribution of a polymer. It is calculated as Mw/Mn, wherein Mw is the weight average molecular weight of the polymer, and Mn is the number average molecular weight of the polymer.

Method of Determining Tack:

Tack was measured with a calibrated Electronic Inkometer (Thwing-Albert Instrument Co.). The material is metered to one milliliter of fluid drawn up into a syringe and placed onto the top rubber roller of the inkometer. The inkometer is turned 'on' to start the rollers rotating and the tack value reported is the maximum value reached. The inkometer is operating at 90° F. and 180 rpm.

Method of Making Ink:

In a grounded container a cyan based (Sun Chemical nitrocellulose base 52217-0310) cyan pigment base and hybrid polymer/polyurethane resin were mixed in a Dispermat-FT (VMA Getzmann GMBH) at 1000-1500 rpm for 3 minutes. N-propyl acetate solvent was added and the batch was further mixed at 1000 rpm for 1 minute, after which the viscosity was measured with a Zahn #2 cup (ASTM, Paul H. Gardner, Co. Pompano Beach, Fla.). Subsequent additions of solvent were mixed in the same manner until press viscosity of between 25 and 29 seconds with a Zahn #2 is achieved.

Method of Determining the Adhesive Lamination Bond Strength:

Substrate films were printed with #8 Meyer rod and dried at 80° C. for 15 seconds. Polymer solutions were all proofed at 30% solids. Polypropylene [AET 523-3] and polyethylene terephthalate [Papertec, Garfield, N.J.] films were used as substrates for printing. A thin layer of adhesive was applied over the print with a #8 Meyer bar and dried at 80° C. for 15 seconds. The adhesive is a mixture of 40.7% Adcote 577 and 2.6% Adcote 577B and 57.1% ethyl acetate. A polyethylene film was laminated over the print with a Hot Roll Laminator [Cheminstruments, Fairfield, Ohio] at room temperature and 40 psi. The laminated structures were allowed to sit for a minimum of 24 hours at room temperature before testing bond strength. The structure was cut into sample strips measuring one inch wide and the 180 degree peel force required to cause delamination was determined using an Instron Tensile Tester 3342 [825 University Ave., Norwood, Mass. 02062-2643]. The sample undergoing testing was placed in the jaws of the Instron. The sample was held at a right angle to the moving jaw and the sample was pulled apart at 300 mm/min. Values for lamination bond strength are recorded, and the procedure is repeated, and an average value is reported. The value has units of g/linear inch. A higher number is an indication of the strength of the lamination bond.

Method of Determining the Tyndall Effect

An 8 oz. sample jar is filled with the polymerized hybrid resin in the solvent medium and the jar is capped. A laser (deep-red color, about 650 nm) is passed through the solvent medium. Particles, if present, will scatter the laser light. This is indicative of a positive Tyndall effect result. If the jar contained a solution, then the light would pass cleanly through the solution, providing a negative Tyndall effect result.

Press Trial

A flexographic unit on the Chesnut press (Richard Chesnut Co. Fairfield, N.J.) was used to print onto Corona treated polyethylene terephthalate or polypropylene substrate (25 cm width). The print unit had an open chamber doctor blade system and ceramic anilox rollers (360 lines/cm). After printing, the printed substrate went through a 10 foot oven at 82° C. Linear speed was varied from 200 to 1000 feet/min.

Base Resins

The examples that follow employ base resins, e.g., polyurethane and polyurethane-urea resins designated herein as PUA, PUB, and PUC. The resins are described below:

| Designation | Polyurethane Resin Source |
|---|---|
| PUA | A polyurethane described in Example UB5 of U.S. Pat. No. 7,563,835 that is soluble in the medium. |
| PUB | A polyurethane-urea resin identified as "Polyurethane C" in US 2010/0279041 on page 7 thereof that is soluble in the medium. |

-continued

| Designation | Polyurethane Resin Source |
|---|---|
| PUC | A polyurethane-urea resin described in U.S. Pat. No. 6,723,820, e.g., in col. 4 lines 17-44 that is soluble in the medium. |

PUA is the polyurethane reaction product of toluene diisocyanate (Bayer), 2,2-dimethylol butanoic acid (Mitsubishi), dimer diol 1075 (Henkel), and 2-methyl-1,3-propanediol (Arco), present in a molar ratio of, respectively: 0.95/0.25/0.12/0.48. It has the following properties: acid number 42, $MW_w$: 6000, and softening point: 120° C.

PUB is a polyurethane-urea resin prepared by reacting 259 parts poly(tetramethylene ether) glycol 2000, 43 parts poly(tetramethylene ether) glycol 1000, 11 parts 1,4-butanediol, and 2 parts dimethylpropionic acid (DMPA) with 105 parts isophorone diisocyanate (IPDI) in propyl acetate, and then reacting 570 parts of the resulting product with 9 parts of ethylene diamine in propanol. PUB has the following properties: Mw 22,200, a viscosity of 546 cP. and a non-volatile content of 31.8%.

In addition to the description in the above table, PUC is more fully described earlier in this disclosure.

The disclosures of U.S. Pat. Nos. 6,723,820 and 7,563,835 and U.S. Patent Application Publication No. 2010/0279041 are incorporated herein by reference.

The following examples illustrate specific aspects of the present invention and are not intended to limit the scope thereof in any respect and should not be so construed.

Inventive Example 1 (Polyurethane-Polyacrylate Hybrid Resin 125.5 g of PUA [Sun Chemical Corporation] and 236.3 g of n-propyl acetate were weighed into a 1.0 L 4-necked round bottom flask equipped with a heating mantle, condenser, overhead stirrer, temperature sensor, gas inlet, and two dropping funnels. 47.0 g isobutyl methacrylate [Evonik Industries], 17.2 g of stearyl methacrylate [Sigma-Aldrich Corporation], and 1.7 g of acrylic acid [Sigma-Aldrich Corporation] were added to dropping funnel number 1. 75.25 g of n-propyl acetate and 0.6 g Luperox 26M50 [t-butyl peroxy 2-ethylhexanoate, 50% in mineral spirits, [Arkema]] were added to dropping funnel number 2. The reaction was heated to 100° C. and then the contents of dropping funnels 1 & 2 were added to the flask over 3 hours. After the additions were finished the reaction was held at this temperature for an additional 3.5 hours, and then the contents of the flask were cooled to 60° C. and discharged into a glass jar. The reaction product was an opaque, tannish-white dispersion with Mn 35,000 Daltons. An opaque, waxy film was obtained by drying a sample of the reaction product at room temperature overnight.

Inventive Example 2 (Polyurethane-Polyacrylate Hybrid Resin 88.1 g of PUA [Sun Chemical Corporation] and 145.8 g of n-propyl acetate were weighed into a 1.0 L 4-necked round bottom flask equipped with a heating mantle, condenser, overhead stirrer, temperature sensor, gas inlet, and two dropping funnels. 58.5 g isobutyl methacrylate [Evonik Industries] was added to dropping funnel number 1. 50.8 g of n-propyl acetate and 0.5 g Luperox 26M50 were added to dropping funnel number 2. The reaction was heated to 100° C. and then the contents of dropping funnels 1 & 2 were added to the flask over 3 hours. After the additions were finished the reaction was held at temperature for 30 minutes, at which time a mixture of 0.2 g Luperox 26M50 and 3.05 g n-propyl acetate was added to the flask. The reaction was held at temperature for an additional 3.5 hours. After which the contents of the flask were cooled to 60° C. and then discharged into a glass jar. The reaction product was opaque, tannish-white dispersion with Mn 3,600 Daltons. An opaque, hard, brittle film was obtained by drying a sample of the reaction product at room temperature overnight.

Inventive Example 3 (Polyurethane-Polyacrylate Hybrid Resin 57.4 g of PUA [Sun Chemical Corporation] and 145.8 g of n-propyl acetate were weighed into a 1.0 L 4-necked round bottom flask equipped with a heating mantle, condenser, overhead stirrer, temperature sensor, gas inlet, and two dropping funnels. 79.8 g isobutyl methacrylate [Evonik Industries] and 11.1 g stearyl methacrylate [Sigma-Aldrich Corporation] were added to dropping funnel number 1. 50.9 g of n-propyl acetate and 0.9 g Luperox 26M50 were added to dropping funnel number 2. The reaction was heated to 100° C. and then the contents of dropping funnels 1 & 2 were added to the flask over 3 hours. After the additions were finished the reaction was held at temperature for 30 minutes, at which time a mixture of 0.4 g Luperox 26M50 and 3.8 g n-propyl acetate was added to the flask. The reaction was held at temperature for an additional 3.5 hours. After which the contents of the flask were cooled to 60° C. and then discharged into a glass jar. The reaction product was opaque, tannish-white dispersion with Mn 4,200 Daltons. An opaque, hard, brittle film was obtained by drying a sample of the reaction product at room temperature overnight.

Inventive Example 4 (Polyurethane-Urea-Polyacrylate Hybrid Resin 33.3 g of PUB [Sun Chemical Corporation] and 84.0 g of n-propyl acetate were weighed into a 1.0 L 4-necked round bottom flask equipped with a heating mantle, condenser, overhead stirrer, temperature sensor, gas inlet, and two dropping funnels. 51.8 g isobutyl methacrylate [Evonik Industries Industries] was added to dropping funnel number 1. 29 g of n-propyl acetate and 0.5 g Luperox 26M50 were added to dropping funnel number 2. The reaction was heated to 100° C. and then the contents of dropping funnels 1 & 2 were added to the flask over 3 hours. After the additions were finished the reaction was held at temperature for 30 minutes, at which time a mixture of 0.2 g Luperox 26M50 and 2.3 g n-propyl acetate was added to the flask. The reaction was held at that temperature for an additional 3.5 hours, after which the contents of the flask were cooled to 70° C. and then discharged into a glass jar. The reaction product was opaque dispersion with Mn 20,000 Daltons. A translucent tough film was obtained by drying a sample of the reaction product at room temperature overnight.

Inventive Example 5 (Polyurethane-Urea-Polyacrylate Hybrid Resin 28.5 g of PUB [Sun Chemical Corporation] and 72.2 g of n-propyl acetate were weighed into a 1.0 L 4-necked round bottom flask equipped with a heating mantle, condenser, overhead stirrer, temperature sensor, gas inlet, and two dropping funnels. 45.5 g isobutyl methacrylate [Evonik Industries Industries] was added to dropping funnel number 1. 25.4 g of n-propyl acetate and 0.4 g Luperox 26M50 were added to dropping funnel number 2. The reaction was heated to 100° C. and then the contents of dropping funnels 1 & 2 were added to the flask over 3 hours. After the additions were finished the reaction was held at that temperature for 30 minutes, at which time a mixture of 0.2 g Luperox 26M50 and 1.7 g n-propyl acetate was added to the flask. The reaction was held at that temperature for an additional 2.25 hours, after which the contents of the flask were cooled to 85° C. and then discharged into a glass jar. The reaction product was opaque dispersion with Mn 29,000 Daltons. A translucent, slightly flexible hard film was obtained by drying a sample of the reaction product at room temperature overnight.

Inventive Example 6
(Polyurethane-Urea-Polyacrylate Hybrid Resin 32.9 g of PUB [Sun Chemical Corporation] and 84.6 g of n-propyl acetate were weighed into a 1.0 L 4-necked round bottom flask equipped with a heating mantle, condenser, overhead stirrer, temperature sensor, gas inlet, and two dropping funnels. 78.7 g isobutyl methacrylate [Evonik Industries Industries] was added to dropping funnel number 1. 29.3 g of n-propyl acetate and 0.5 g Luperox 26M50 were added to dropping funnel number 2. The reaction was heated to 100° C. and then the contents of dropping funnels 1 & 2 were added to the flask over 3 hours. After the additions were finished the reaction was held at that temperature for 30 minutes, at which time a mixture of 0.2 g Luperox 26M50 and 1.8 g n-propyl acetate was added to the flask. The reaction was held at that temperature for an additional 3.0 hours, after which the contents of the flask were cooled to 55° C. and then discharged into a glass jar. The reaction product was opaque dispersion with Mn 18,000 Daltons. A translucent, tough film was obtained by drying a sample of the reaction product at room temperature overnight.

Inventive Example 7
(Polyurethane-Urea-Polyacrylate Hybrid Resin 62.0 g of PUB [Sun Chemical Corporation] and 169.6 g of n-propyl acetate were weighed into a 1.0 L 4-necked round bottom flask equipped with a heating mantle, overhead stirrer, condenser, temperature sensor, gas inlet, and two dropping funnels. 154.3 g isobutyl methacrylate [Evonik Industries Industries] was added to dropping funnel number 1. 58.4 g of n-propyl acetate and 1.1 g Luperox 26M50 were added to dropping funnel number 2. The reaction was heated to 100° C. and then the contents of dropping funnels 1 & 2 were added to the flask over 3 hours. After the additions were finished the reaction was held at that temperature for 30 minutes, at which time a mixture of 0.4 g Luperox 26M50 and 3.6 g n-propyl acetate was added to the flask. The reaction was held at that temperature for an additional 2.25 hours, after which the contents of the flask were cooled to 75° C. and then discharged into a glass jar. The reaction product was opaque dispersion with Mn 23,000 Daltons. A translucent tough, flexible film was obtained by drying a sample of the reaction product at room temperature overnight.

Inventive Example 8
(Polyurethane-Urea-Polyacrylate Hybrid Resin 64.5 g of PUC [Sun Chemical Corporation] and 195 g of n-propyl acetate were weighed into a 1.0 l 4-necked round bottom flask equipped with a heating mantle, overhead stirrer, condenser, temperature sensor, gas inlet, and two dropping funnels. 154.2 g isobutyl methacrylate [Evonik Industries] was added to dropping funnel number 1. 60.7 g of n-propyl acetate and 1.15 g Luperox 26M50 were added to dropping funnel number 2. The reaction was heated to 100° C. and then the contents of dropping funnels #1 & #2 were added to the flask over 3 hours. After the additions were finished the reaction was held at that temperature for 30 minutes, at which time a mixture of 0.4 g Luperox 26M50 and 3.7 g n-propyl acetate was added to the flask over 30 minutes. The reaction was held at that temperature for an additional 3.0 hours, after which the contents of the flask were cooled and then discharged into a glass jar. The reaction product was a translucent dispersion with Mn 14,000 Daltons. A translucent hard, flexible film with good adhesion to aluminum was obtained by drying a sample of the reaction product at room temperature overnight.

Inventive Example 9
(Polyurethane-Urea-Polyacrylate Hybrid Resin 200.6 g of PUB [Sun Chemical Corporation] and 120.5 g n-propyl acetate were weighed into a 1.0 L 4-necked round bottom flask equipped with a heating mantle, overhead stirrer, condenser, temperature sensor, gas inlet, and condensing column. Two addition funnels were connected to the flask. Addition funnel #1 contained 92.2 g isobutyl methacrylate [Evonik Industries] and 65.1 g of methyl methacrylate [Sigma-Aldrich Corporation]. Addition funnel #2 contained 44.1 g of n-propyl acetate and 0.85 g Luperox 26M50. The reaction was heated to 100° C. and then the contents of dropping funnels 1 & 2 were added to the flask over 2 hours. Thirty minutes after the addition has finished a third dropping funnel containing 34.1 g n-propyl acetate and 0.35 g Luperox 26M50 was connected to the flask. The contents of the addition funnel were added drop-wise over 30 minutes to the flask. After the addition was finished the reaction was held at that temperature for additional 3 hours, after which the contents of the flask were cooled to 60° C. and then discharged into a glass jar. The reaction product was a hazy dispersion with Mn 29,000 Daltons.

Inventive Example 10
(Polyurethane-Urea-Polyacrylate Hybrid Resin 201 g of PUB [Sun Chemical Corporation] and 123.2 g n-propyl acetate were weighed into a 1.0 L 4-necked round bottom flask equipped with a heating mantle, overhead stirrer, condenser, temperature sensor, gas inlet, Dean-Stark trap, and condensing column. The contents of the flask were distilled to remove n-propanol in the standard method. The distillate removed was 178 g and was replaced with 179.4 g n-propyl acetate. The Dean-Stark trap was removed. Two addition funnels were connected to the flask. Addition funnel #1 contained 92.2 g isobutyl methacrylate [Evonik Industries], and 65.75 g of methyl methacrylate [Sigma-Aldrich Corporation]. Addition funnel #2 contained 45 g of n-propyl acetate and 0.83 g Luperox 26M50. The reaction was heated to 100° C. and then the contents of dropping funnels 1 & 2 were added to the flask over 3 hours. Thirty minutes after the addition has finished a third dropping funnel containing 34.9 g n-propyl acetate and 0.34 g Luperox 26M50 was connected to the flask. The contents of the addition funnel were added drop-wise over 30 minutes to the flask. After the addition was finished the reaction was held at that temperature for additional 3 hours, after which the contents of the flask were cooled to 60° C. and then discharged into a glass jar. The reaction product was a hazy dispersion with Mn 24,000 Daltons.

Inventive Example 11
(Polyurethane-Urea-Polyacrylate Hybrid Resin 240.8 g of PUB [Sun Chemical Corporation] and 125.5 g n-propyl acetate were weighed into a 1.0 L 4-necked round bottom flask equipped with a heating mantle, overhead stirrer, condenser, temperature sensor, gas inlet, and condensing column. Two addition funnels were connected to the flask. Addition funnel #1 contained 68.8 g isobutyl methacrylate [Evonik Industries], and 48.8 g of methyl methacrylate [Sigma-Aldrich Corporation]. Addition funnel #2 contained 44.2 g of n-propyl acetate and 1.70 g Luperox 26M50. The reaction was heated to 100° C. and then the contents of dropping funnels 1 & 2 were added to the flask over 2 hours. Thirty minutes after the addition, a third dropping funnel containing 34.4 g n-propyl acetate and 0.71 g Luperox 26M50 was connected to the flask. The contents of the addition funnel were added drop-wise over 30 minutes to the flask. After the addition was finished the reaction was held at that temperature for additional 3 hours, after which the contents of the flask were cooled to 60° C. and then discharged into a glass jar. The reaction product was a hazy dispersion with Mn 10,000 Daltons.

Inventive Example 12
(Polyurethane-Urea-Polyacrylate Hybrid Resin 33.0 g of PUC [Sun Chemical Corporation] and 83.9 g of n-propyl acetate were weighed into a 1.0 L 4-necked round bottom flask equipped with a heating mantle, overhead stirrer, condenser, temperature sensor, gas inlet, and two dropping funnels. 77.1 g isobutyl methacrylate [Evonik Industries] was added to dropping funnel number 1. 29.8 g of n-propyl acetate and 0.5 g Luperox 26M50 were added to dropping funnel number 2. The reaction was heated to 100° C. and then the contents of dropping funnels 1 & 2 were added to the flask over 3 hours. After the additions were finished the reaction was held at that temperature for 30 minutes, at which time a mixture of 0.2 g Luperox 26M50 and 1.8 g n-propyl acetate was added to the flask. The reaction was held at that temperature for an additional 3.0 hours, after which the contents of the flask were cooled to 75° C. and then discharged into a glass jar. The reaction product was opaque dispersion with Mn 23,000 Daltons. A hard, brittle film was obtained by drying a sample of the reaction product.

Inventive Example 13 (Polyurethane-Polyacrylate
Hybrid Resin 347.5 g of PUA [Sun Chemical Corporation] was distilled to remove isopropyl alcohol and 0.95 g of isobutylmethacrylate were weighed into a 1.0 L 4-necked round bottom flask equipped with a heating mantle, overhead stirrer, temperature sensor, gas inlet, and two dropping funnels. 17.2 g isobutyl methacrylate [Evonik Industries] was added to dropping funnel number 1. 20.2 g of n-propyl acetate and 0.4 g Luperox 26M50 were added to dropping funnel number 2. The reaction was heated to 100° C. and then the contents of dropping funnels 1 & 2 were added to the flask over 2 hours. After the additions were finished the reaction was held at that temperature for 30 minutes, at which time a mixture of 0.06 g Luperox 26M50 and 10.1 g n-propyl acetate was added to the flask over 30 minutes. The reaction was held at that temperature for an additional 3.0 hours, after which 3.7 g n-propyl acetate was added to the flask, and then the contents of the flask were cooled and discharged into a glass jar. The reaction product was a translucent dispersion with Mn 10,000 Daltons. The ratio of PU:Ac is 85:15.

Inventive Example 14 (Polyurethane-Polyacrylate
Hybrid Resin 66.5 g of PUA [Sun Chemical Corporation] was distilled to remove isopropyl alcohol, 140.1 g n-propyl acetate, and 5.5 g of isobutylmethacrylate were weighed into a 1.0 L 4-necked round bottom flask equipped with a heating mantle, overhead stirrer, temperature sensor, gas inlet, and two dropping funnels. 102.6 g isobutyl methacrylate [Evonik Industries] was added to dropping funnel number 1. 40.2 g of n-propyl acetate and 2.5 g Luperox 26M50 were added to dropping funnel number 2. The reaction was heated to 100° C. and then the contents of dropping funnels 1 & 2 were added to the flask over 2 hours. After the additions were finished, the reaction was held at that temperature for 30 minutes, at which time a mixture of 0.2 g Luperox 26M50 and 20.2 g n-propyl acetate was added to the flask over 30 minutes. The reaction was held at temperature for an additional 3.0 hours, after which 25 g n-propyl acetate was added to the flask, and then the contents of the flask were cooled and discharged into a glass jar. The reaction product was a translucent dispersion with Mn 15,000 Daltons. The ratio of PU:Ac is 15:85.

Inventive Example 15
(Polyurethane-Urea-Polyacrylate Hybrid Resin 422 g of PUB [Sun Chemical Corporation] and 484 g of n-propyl acetate were weighed into a 3.0 l 4-necked round bottom flask equipped with a heating mantle, overhead stirrer, temperature sensor, gas inlet, and two dropping funnels. 386 g isobutyl methacrylate [Evonik Industries] was added to dropping funnel number 1. 237 g of n-propyl acetate and 8.79 g Luperox 26M50 were added to dropping funnel number 2. The reaction was heated to 100° C. and then the contents of dropping funnels 1 & 2 were added to the flask over 3 hours. After the additions were finished the reaction was held at that temperature for 30 minutes, at which time a mixture of 1.7 g Luperox 26M50 and 103 g n-propyl acetate was added to the flask. The reaction was held at temperature for an additional 2.25 hours, after which the contents of the flask were cooled to 85° C. and then discharged into a glass jar. The reaction product was opaque dispersion with Mn 10,000 Daltons. A translucent, slightly flexible hard film was obtained by drying a sample of the reaction product.

Inventive Example 16
(Polyurethane-Urea-Polyacrylate Hybrid Resin 352.9 g of PUB [Sun Chemical Corporation] and 671 g of n-propyl acetate were weighed into a 3.0 L 4-necked round bottom flask equipped with a heating mantle, overhead stirrer, temperature sensor, gas inlet, and two dropping funnels. 457.7 g isobutyl methacrylate [Evonik Industries] was added to dropping funnel number 1. 235.7 g of n-propyl acetate and 9.75 g Luperox 26M50 were added to dropping funnel number 2. The reaction was heated to 100° C. and then the contents of dropping funnels 1 & 2 were added to the flask over 3 hours. After the additions were finished the reaction was held at that temperature for 30 minutes, at which time a mixture of 1.8 g Luperox 26M50 and 173 g n-propyl acetate was added to the flask. The reaction was held at temperature for an additional 2.25 hours, after which the contents of the flask were cooled to 85° C. and then discharged into a glass jar. The reaction product was opaque dispersion with Mn 10,000 Daltons. A translucent, slightly flexible hard film was obtained by drying a sample of the reaction product.

Comparative Example 1: A Simple Mixture of Polyurethane and Polyacrylate Resins 2.5 g of PUA [Sun Chemical Corporation] and 7.5 g of polyacrylate resin solution [Mz+1~130,000; 22.5% solids in n-propyl acetate, 13% stearyl methacrylate [Sigma-Aldrich Corporation] and 87% isobutyl methacrylate (i-BMA) [Evonik Industries] were placed in a glass vial and then sealed. The vial was then placed into a 93° C. oven for 48 hours, vigorously shaken and once removed was allowed to cool to room temperature. Upon inspection, the contents of the vial were divided into two separate layers with a solid bottom layer and a cloudy, liquid layer on top.

Comparative Example 2: Attempted Reaction Between Polyurethane Resin and a Commercially Available Polyacrylate Resin 32.99 g of PUA [Sun Chemical Corporation], 246.9 g of n-propyl acetate, 51.66 g Joncryl 611 [BASF] were weighed into a 1.0 L, 4-necked round bottom flask equipped with a heating mantle, overhead stirrer, temperature sensor, gas inlet, and condenser. The contents of the flask were heated to 100° C. with stirring to dissolve the resins. 31.7 g of n-propyl acetate and 0.72 g Luperox 26M50 were added to a dropping funnel. The contents of the dropping funnel were added to the flask over 1.5 hours. After the addition was finished the reaction was held at temperature for an additional 3.5 hours, after which the contents of the flask were cooled to 80° C. and discharged into a glass jar. The reaction produced two (2) discreet layers, with solid polymer on bottom and clear liquid on top. The formation of two discreet layers demonstrates that there is an absence of stability in the medium.

TABLE 1

Tyndall effect results on polymer systems

| Sample | Tyndall Effect | Stable | Tack |
| --- | --- | --- | --- |
| Comparative Example 1 | No | No | |
| Comparative Example 2 | No | No | |
| PUC | No | Yes | 12.4 |
| Example 1 | Yes | Yes | 3.8 |
| Example 2 | Yes | Yes | Not measured |
| Example 3 | Yes | Yes | 4.2 |
| Example 4 | Yes | Yes | 4.1 |
| Example 5 | Yes | Yes | 4.5 |
| Example 6 | Yes | Yes | 3.9 |
| Example 7 | Yes | Yes | 3.1 |
| Example 8 | Yes | Yes | 9.2 |
| Example 9 | Yes | Yes | 1.8 |
| Example 10 | Yes | Yes | 6.1 |
| Example 11 | Yes | Yes | Not measured |
| Example 12 | Yes | Yes | 6.0 |
| Example 13 | Yes | Yes | 4.9 |
| Example 14 | Yes | Yes | 7.0 |
| Example 15 | Yes | Yes | 6.2 |
| Example 16 | Yes | Yes | 6.4 |

Comparative Example 1 shows that mixing polyurethane and polyacrylate together does not yield a stable dispersion. Comparative Example 2 shows that mixing polyurethane and polyacrylate and then adding an initiator and heating does not lead to a stable dispersion. In neither comparative example did the clear solution give a positive Tyndall effect so were not non-aqueous dispersions. All Inventive Examples had significantly lower tacks than reference solution PUC which is an important property needed for high speed printing Comparative OPV Testing Inventive Example 6 was used with 5% added Incozol LV (Incorez Ltd) a bis-oxazolidine crosslinker and compared to Sleeveflex OPV (Sun Chemical). Each was printed over Sunate C blue ink (Sun Chemical CRVGS5034607) on PET-G film using a 160 line flexo hand proofer. Each print was allowed to air dry between each application. The Spray & Wash resistance of the OPV was assessed by soaking a Q-tip in the Spray & Wash and rubbing the OPV until the OPV failed and the Q-tip became colored by the underlying inks. The number of back and forth wipe is an indication of the ability of the OPV to protect the underlying inks from the Spray and Wash. The higher the number of wipes, the better is the coating. The OPV based on Inventive Example 6 with 5% added Incozol LV required 100+ wipes compared to the Sleevflex OPV which failed after 10 wipes.

Comparative Lamination Testing

Inventive Example 12, a hybrid polyurethane-urea-polyacrylate resin containing PUC and for comparison, PUC, were both diluted to approximately 30% solids with n-propyl acetate. Both were coated onto substrate onto polypropylene and laminated. Testing occurred after 24 and 144 hours. Lamination results indicate the dispersion hybrid polymer has improved lamination bond strength compared to its base polyurethane on polypropylene film.

TABLE 2

Lamination bond strength of control polyurethane-urea (PUC) resin and dispersion polymer

| | Polypropylene [24 hr.] [g/linear inch] | Polypropylene [144 hr.] [g/linear inch] |
| --- | --- | --- |
| PUC | 380 | 450 |
| Inventive Example 12 | 450 | 475 |

TABLE 3

Ink formulations for Chesnut press trial

| | Inventive Ink A | Inventive Ink B | Comparative Ink C |
| --- | --- | --- | --- |
| Cyan Base | 50.7 | 49.8 | 45.8 |
| Inventive Example 15 | 33.7 | — | — |
| Inventive Example 16 | — | 33.2 | — |
| PUC | — | — | 30.8 |
| n-propyl acetate | 15.6 | 17 | 23.4 |
| Total | 100.0 | 100.0 | 100.0 |
| % resin solids from varnish only | 11.5 | 11.9 | 9.8 |
| Viscosity w/Zahn #2 cup (sec) | 26.6 | 26.4 | 25.8 |
| Tack- press ready ink- 180 rpm @ 90° F. (g-linear in) | 2.1 | 1.4 | 6.2 |

The initial tack of the resin system was measured and then made into inks as described above. The tack values of the inks based on the inventive non-aqueous dispersions were much lower than the ink made from the solution resin. Tack is an important property needed for high speed printing.

The inks were run on the Chesnut press and the printed films were made into lamination testing samples as described earlier. Samples were tested after being laminated at 24 hours and 30 days to determine bond strength as a function of time. The samples were laminated to either polypropylene film (PP) or polyethylene terephthalate (PET) film for the testing.

TABLE 4

Adhesive Bond Strengths for Laminate Structures Made From Chesnut Press Trial On PP

|  | PP - 24 hours | PP - 30 days |
| --- | --- | --- |
| Inventive Ink A | 255 | 265 |
| Inventive Ink B | 328 | 293 |
| Comparative Ink C | 250 | 258 |

Inventive Ink A is based on Inventive Example 15 which contains 40% polyurethane-urea-polyacrylate resin (PUB). It has bonds comparably on polypropylene after 24 hours and 30 days to Comparative Ink C, which is made from 100% PUC (polyurethane-urea resin). Inventive Ink B is based on Inventive Example 16 which contains 30% polyurethane-urea-polyacrylate resin (PUB). In terms of bonding on polypropylene after 24 hours and 30 days, it is superior to Comparative Ink C. The improved bond strength was achievable at a lower overall tack value for the inventive inks, which is more conducive for high speed printing applications.

TABLE 5

Adhesive bond strengths for laminate structures made from Chesnut press trial on PET
Adhesion strength of laminate [g/linear inch]

|  | PET- 24 hours | PET - 7 days | PET- 30 days |
| --- | --- | --- | --- |
| Inventive Ink B | 370 | 383 | 393 |
| Comparative Ink C | 300 | 265 | 395 |

Inventive Ink B is based on Inventive Example 15 which contains 30% polyurethane-urea-polyacrylate resin. Compared to Comparative Ink C, which is made from 100% solution polyurethane, inventive ink B has superior bonding properties on polyethylene terephthalate after 24 hours and 7 days and comparable bonding properties after 30 days. The improved bond strength was achievable at a lower overall tack value for the inventive inks, which is more conducive for high speed printing applications.

The present invention has been described in detail, including the preferred embodiments thereof, but is more broadly applicable as will be understood by those skilled in the art. It will be appreciated that those skilled in the art, upon consideration of the present disclosure, may make modifications and/or improvements on this invention that fall within the scope and spirit of the invention. Since modifications will be apparent to those of skill in this art, it is intended that this invention be limited only by the scope of the following claims.

What is claimed is:

1. A non-aqueous dispersion comprising dispersed polymeric hybrid resins in a non-aqueous medium, wherein the non-aqueous medium consists of one or more solvents selected from the group consisting of alcohols, esters and ketones, the dispersed polymeric hybrid resins selected from polyurethane-polyacrylate, polyurethane-urea-polyacrylate, and polyurea-polyacrylate, which hybrid resins are produced in the non-aqueous medium in a polymerization reaction between one or more ethylenically unsaturated acrylates and one or more of a polyurethane, a polyurethane-urea, and a polyurea polymer soluble in the medium, wherein the non-aqueous dispersion contains no aromatic hydrocarbon solvents.

2. The non-aqueous dispersion of claim 1, wherein the non-aqueous medium is selected from the group consisting of one or more of esters and ketones wherein the ethylenically unsaturated acrylate monomers are soluble in the medium.

3. The non-aqueous dispersion of claim 1, wherein the one or more ethylenically unsaturated acrylates are selected from monofunctional ethylenically unsaturated acrylate monomers, multifunctional ethylenically unsaturated acrylate monomers, and mixtures thereof.

4. The non-aqueous dispersion of claim 1, wherein the ratio of the polyurethane, polyurethane-urea, or polyurea to polyacrylate in the hybrid resins is, on a molar basis, 10/90 to 90/10.

5. The non-aqueous dispersion of claim 1, wherein the hybrid resins in the dispersion have a number average molecular weight of about 1,000 Daltons to about 200,000 Daltons.

6. A non-aqueous dispersion comprising the polymeric hybrid resins of the non-aqueous dispersion of claim 1, transferred to a second non-aqueous medium consisting of solvents selected from the group consisting of alcohols, esters, ketones and ethers that is different from the non-aqueous medium of claim 1, wherein the non-aqueous dispersion formed by transfer to a second non-aqueous medium contains no aromatic hydrocarbon solvents.

7. The non-aqueous dispersion of claim 1, wherein the hybrid resins are at least partially insoluble in the non-aqueous medium.

8. An ink-, coating-, primer-, or overprint varnish-composition, comprising the non-aqueous dispersion of claim 1.

9. The composition of claim 8, further comprising a colorant.

10. The composition of claim 8 wherein the composition comprises, by weight, about 15 wt % to about 50 wt % of the hybrid resin; about 6 wt % to about 30 wt % of a colorant; and about 10 wt % to about 60 wt % of the organic solvent.

11. A process of coating a substrate, comprising applying the composition of claim 8 to a substrate.

12. The process of claim 11, wherein the composition is applied by a deposition method selected from flexo, gravure, digital, rod, curtain, cascade, roll, slot, or spray processes or a combination thereof.

* * * * *